US011144712B2

(12) United States Patent
Kojima

(10) Patent No.: US 11,144,712 B2
(45) Date of Patent: Oct. 12, 2021

(54) DICTIONARY CREATION APPARATUS, DICTIONARY CREATION METHOD, AND NON-TRANSITORY COMPUTER-READABLE STORAGE MEDIUM FOR STORING DICTIONARY CREATION PROGRAM

(71) Applicant: FUJITSU LIMITED, Kawasaki (JP)

(72) Inventor: Yuji Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/990,542

(22) Filed: Aug. 11, 2020

(65) Prior Publication Data

US 2021/0064814 A1 Mar. 4, 2021

(30) Foreign Application Priority Data

Sep. 2, 2019 (JP) .............................. JP2019-159570

(51) Int. Cl.
*G06F 11/07* (2006.01)
*G06F 40/157* (2020.01)
*G06F 40/166* (2020.01)

(52) U.S. Cl.
CPC .......... *G06F 40/157* (2020.01); *G06F 11/079* (2013.01); *G06F 11/0766* (2013.01); *G06F 11/0787* (2013.01); *G06F 40/166* (2020.01)

(58) Field of Classification Search
CPC ....... G06F 11/0766–079; G06F 40/157; G06F 40/166; G06F 40/242
See application file for complete search history.

(56) References Cited

U.S. PATENT DOCUMENTS

| 2004/0078689 A1* | 4/2004 | Knuutila | ............ G06F 11/0709 714/38.1 |
| 2007/0294597 A1* | 12/2007 | Kalavacharla | ...... G06F 11/0772 714/52 |
| 2010/0058112 A1* | 3/2010 | Kim | .................... G06F 11/2252 714/37 |
| 2011/0066908 A1* | 3/2011 | Bartz | .................. G06F 11/0709 714/746 |

(Continued)

FOREIGN PATENT DOCUMENTS

| JP | H11-154160 A | 6/1999 |
| JP | 2002-259367 A | 9/2002 |

(Continued)

*Primary Examiner* — Keith D Bloomquist
(74) *Attorney, Agent, or Firm* — Fujitsu Patent Center

(57) ABSTRACT

Embodiments generally relate to a solution to easily create a dictionary in which a character string to be extracted from a log of an apparatus is registered. In an example, a method includes extracting a first plurality of character strings from a first dictionary to determine types of the first plurality of extracted character strings, the first plurality of character strings having a common part at a part thereof, the a first dictionary including character strings extracted from a log of a first apparatus; extracting a second plurality of character strings having the common part from the log of the first apparatus to determine types of the second plurality of character strings; executing a first determination processing that includes determining whether the types of the first plurality of character strings are limited with respect to the types of the second plurality of character strings.

9 Claims, 16 Drawing Sheets

(56) References Cited

U.S. PATENT DOCUMENTS

| | | | | |
|---|---|---|---|---|
| 2013/0067283 | A1* | 3/2013 | Lee | G06F 11/0751 |
| | | | | 714/37 |
| 2014/0122932 | A1* | 5/2014 | Chen | G06F 11/0706 |
| | | | | 714/37 |
| 2018/0143954 | A1* | 5/2018 | Nakamura | G06F 40/284 |
| 2020/0372113 | A1* | 11/2020 | Thomas | G06F 40/211 |

FOREIGN PATENT DOCUMENTS

| | | |
|---|---|---|
| JP | 2005-190232 A | 7/2005 |
| JP | 2016-134124 A | 7/2016 |
| JP | 2018-136656 A | 8/2018 |

* cited by examiner

FIG. 9A

| 1 | HARDWARE FAULT (I/OMod-EX) |
|---|---|
| 2 | HARDWARE FAULT (MDirAgnt 100) |
| 3 | HARDWARE FAULT (MDirAgnt 50) |
| 4 | HARDWARE FAULT (PCI-I/F) |
| 5 | HARDWARE FAULT (COMP) |
| 6 | HARDWARE FAULT (GVM10-6) |
| 7 | HARDWARE FAULT (PRB) |
| 8 | SOFTWARE FAULT (momory image) |
| 9 | SOFTWARE FAULT (RDM) |
| 10 | SOFTWARE FAULT (Ver-Miss) |
| 11 | Service Level * has occurred with core |

FIG. 9B

| 1 | HARDWARE FAULT (I/OMod-EX) | BASE POINT |
|---|---|---|
| 2 | *HARDWARE FAULT* (MDirAgnt 100) | COMPARISON TARGET 1 |
| 3 | *HARDWARE FAULT* (MDirAgnt 50) | COMPARISON TARGET 2 |
| 4 | *HARDWARE FAULT* (PCI-I/F) | COMPARISON TARGET 3 |
| 5 | *HARDWARE FAULT* (COMP) | COMPARISON TARGET 4 |
| 6 | *HARDWARE FAULT* (GVM10-6) | COMPARISON TARGET 5 |
| 7 | *HARDWARE FAULT* (PRB) | COMPARISON TARGET 6 |
| 8 | SOFTWARE FAULT (momory image) | COMPARISON TARGET 7 |
| 9 | SOFTWARE FAULT (RDM) | COMPARISON TARGET 8 |
| 10 | SOFTWARE FAULT (Ver-Miss) | COMPARISON TARGET 9 |
| 11 | Service Level * has occurred with core | COMPARISON TARGET 10 |

FIG. 10A

|   | FIXED PORTION | VARIABLE PORTION |
|---|---|---|
| 1 | HARDWARE FAULT | (I/OMod-EX) |
| 2 | HARDWARE FAULT | (MDirAgnt 100) |
| 3 | HARDWARE FAULT | (MDirAgnt 50) |
| 4 | HARDWARE FAULT | (PCI-I/F) |
| 5 | HARDWARE FAULT | (COMP) |
| 6 | HARDWARE FAULT | (GVM10-6) |
| 7 | HARDWARE FAULT | (PRB) |

FIG. 10B

| 8 | SOFTWARE FAULT (momory image) | BASE POINT |
|---|---|---|
| 9 | *SOFTWARE FAULT* (RDM) | COMPARISON TARGET 1 |
| 10 | *SOFTWARE FAULT* (Ver-Miss) | COMPARISON TARGET 2 |
| 11 | Service Level * has occurred with core | COMPARISON TARGET 3 |

FIG. 10C

|   | FIXED PORTION | VARIABLE PORTION |
|---|---|---|
| 8 | SOFTWARE FAULT | (momory image) |
| 9 | SOFTWARE FAULT | (RDM) |
| 10 | SOFTWARE FAULT | (Ver-Miss) |

FIG. 10D

|   | FIXED PORTION | VARIABLE PORTION | FIXED PORTION |
|---|---|---|---|
| 11 | Service Level | * | has occurred with core |

FIG. 11

(a) <LOG OF EXISTING APPARATUS>

```
status change out of service
configuration object create
SOB object modified
CLI service started
HARDWARE FAULT (PRB)
HARDWARE FAULT (MDirAgnt 100)
HARDWARE FAULT (PCI-I/F)
WARNING REDUNDANCY IPSEC IPSEC #10
WARNING REDUNDANCY IPSEC IPSEC #100
SOFTWARE FAULT (multi50)
sync status down
HARDWARE FAULT (GVM10-6)
HARDWARE FAULT (COMP)
SOFTWARE FAULT (RDM)
SOFTWARE FAULT (momory image)
HARDWARE FAULT (YMZ)
HARDWARE FAULT (MDirAgnt 50)
WARNING REDUNDANCY IPSEC IPSEC #20
status change in service
SOFTWARE FAULT (Ver-Miss)
HARDWARE FAULT (I/OMod-EX)
SOFTWARE FAULT (Multi100)
..........
..........
..........
..........
```

(b) <PHRASE EXTRACTED FROM LOG OF EXISTING APPARATUS>

|   | FIXED PORTION | VARIABLE PORTION |
|---|---|---|
| 1 | HARDWARE FAULT | (I/OMod-EX) |
| 2 | HARDWARE FAULT | (MDirAgnt 100) |
| 3 | HARDWARE FAULT | (MDirAgnt 50) |
| 4 | HARDWARE FAULT | (PCI-I/F) |
| 5 | HARDWARE FAULT | (COMP) |
| 6 | HARDWARE FAULT | (GVM10-6) |
| 7 | HARDWARE FAULT | (PRB) |
| 8 | HARDWARE FAULT | (YMZ) |

FIG. 12

<EXTRACTED PHRASES (AFTER SHAPING)>

| | FIXED PORTION | VARIABLE PORTION |
|---|---|---|
| 1 | HARDWARE FAULT | (I/OMod-EX) |
| 2 | HARDWARE FAULT | (MDirAgnt 100) |
| 3 | HARDWARE FAULT | (MDirAgnt 50) |
| 4 | HARDWARE FAULT | (PCI-I/F) |
| 5 | HARDWARE FAULT | (COMP) |
| 6 | HARDWARE FAULT | (GVM10-6) |
| 7 | HARDWARE FAULT | (PRB) |

SEVEN TYPES (NARROWED DOWN)

MATCH

<PHRASE EXTRACTED FROM LOG OF EXISTING APPARATUS>

| | FIXED PORTION | VARIABLE PORTION |
|---|---|---|
| 1 | HARDWARE FAULT | (I/OMod-EX) |
| 2 | HARDWARE FAULT | (MDirAgnt 100) |
| 3 | HARDWARE FAULT | (MDirAgnt 50) |
| 4 | HARDWARE FAULT | (PCI-I/F) |
| 5 | HARDWARE FAULT | (COMP) |
| 6 | HARDWARE FAULT | (GVM10-6) |
| 7 | HARDWARE FAULT | (PRB) |
| 8 | HARDWARE FAULT | (YMZ) |

EIGHT TYPES

FIG. 13

<EXTRACTED PHRASES (AFTER SHAPING)>

| | FIXED PORTION | VARIABLE PORTION |
|---|---|---|
| 1 | HARDWARE FAULT | (I/OMod-EX) |
| 2 | HARDWARE FAULT | (MDirAgnt 100) |
| 3 | HARDWARE FAULT | (MDirAgnt 50) |
| 4 | HARDWARE FAULT | (PCI-I/F) |
| 5 | HARDWARE FAULT | (COMP) |
| 6 | HARDWARE FAULT | (GVM10-6) |
| 7 | HARDWARE FAULT | (PRB) |

SEVEN TYPES

 (NOT NARROWED DOWN)

MATCH

<PHRASE EXTRACTED FROM LOG OF EXISTING APPARATUS>

| | FIXED PORTION | VARIABLE PORTION |
|---|---|---|
| 1 | HARDWARE FAULT | (I/OMod-EX) |
| 2 | HARDWARE FAULT | (MDirAgnt 100) |
| 3 | HARDWARE FAULT | (MDirAgnt 50) |
| 4 | HARDWARE FAULT | (PCI-I/F) |
| 5 | HARDWARE FAULT | (COMP) |
| 6 | HARDWARE FAULT | (GVM10-6) |
| 7 | HARDWARE FAULT | (PRB) |

SEVEN TYPES

FIG. 14A

<EXTRACTED PHRASES (AFTER SHAPING)>

| | FIXED PORTION | VARIABLE PORTION | FIXED PORTION |
|---|---|---|---|
| 1 | Service Level | 1 | has occurred with core |
| 2 | Service Level | 2 | has occurred with core |

TWO TYPES    (NOT NARROWED DOWN)

<PHRASE EXTRACTED FROM LOG OF EXISTING APPARATUS>

| | FIXED PORTION | VARIABLE PORTION | FIXED PORTION |
|---|---|---|---|
| 1 | Service Level | 1 | has occurred with core |
| 2 | Service Level | 2 | has occurred with core |

TWO TYPES

FIG. 14B

<EXTRACTED PHRASES (AFTER SHAPING)>

| | FIXED PORTION | VARIABLE PORTION | FIXED PORTION |
|---|---|---|---|
| 1 | Service Level | 1 | has occurred with core |

ONE TYPE

 (NARROWED DOWN)

<PHRASE EXTRACTED FROM LOG OF EXISTING APPARATUS>

| | FIXED PORTION | VARIABLE PORTION | FIXED PORTION |
|---|---|---|---|
| 1 | Service Level | 1 | has occurred with core |
| 2 | Service Level | 2 | has occurred with core |

TWO TYPES

FIG. 15

(a) <PHRASE EXTRACTED FROM LOG OF NEW APPARATUS>

| | FIXED PORTION | VARIABLE PORTION |
|---|---|---|
| 1 | HARDWARE FAULT | (I/OMod-EX) |
| 2 | HARDWARE FAULT | (MDirAgnt 100) |
| 3 | HARDWARE FAULT | (PCI-I/F) |
| 4 | HARDWARE FAULT | (GVM10-6) |
| 5 | HARDWARE FAULT | (PRB) |
| 6 | HARDWARE FAULT | (YMZ) |
| 7 | HARDWARE FAULT | (ISA) |

(b) <PHRASE EXTRACTED FROM LOG OF EXISTING APPARATUS>

| | FIXED PORTION | VARIABLE PORTION |
|---|---|---|
| 1 | HARDWARE FAULT | (I/OMod-EX) |
| 2 | HARDWARE FAULT | (MDirAgnt 100) |
| 3 | HARDWARE FAULT | (MDirAgnt 50) |
| 4 | HARDWARE FAULT | (PCI-I/F) |
| 5 | HARDWARE FAULT | (COMP) |
| 6 | HARDWARE FAULT | (GVM10-6) |
| 7 | HARDWARE FAULT | (PRB) |
| 8 | HARDWARE FAULT | (YMZ) |

(c)

| | FIXED PORTION | VARIABLE PORTION | LOG OF NEW APPARATUS | LOG OF EXISTING APPARATUS |
|---|---|---|---|---|
| 1 | HARDWARE FAULT | (I/OMod-EX) | PRESENCE | PRESENCE |
| 2 | HARDWARE FAULT | (MDirAgnt 100) | PRESENCE | PRESENCE |
| 3 | HARDWARE FAULT | (MDirAgnt 50) | ABSENCE | PRESENCE |
| 4 | HARDWARE FAULT | (PCI-I/F) | PRESENCE | PRESENCE |
| 5 | HARDWARE FAULT | (COMP) | ABSENCE | PRESENCE |
| 6 | HARDWARE FAULT | (GVM10-6) | PRESENCE | PRESENCE |
| 7 | HARDWARE FAULT | (PRB) | PRESENCE | PRESENCE |
| 8 | HARDWARE FAULT | (YMZ) | PRESENCE | PRESENCE |
| 9 | HARDWARE FAULT | (ISA) | PRESENCE | ABSENCE |

MATCHING DEGREE = NUMBER OF MATCHES / TOTAL NUMBER OF PHRASES = 6/9 ≈ 0.67

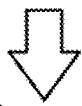

DIVERT PHRASES HAVING FIXED PORTION "HARDWARE FAULT" IN DICTIONARY OF EXISTING APPARATUS TO DICTIONARY OF NEW APPARATUS AS IT IS (d) <DICTIONARY OF NEW APPARATUS>

| | |
|---|---|
| 1 | HARDWARE FAULT (I/OMod-EX) |
| 2 | HARDWARE FAULT (MDirAgnt 100) |
| 3 | HARDWARE FAULT (MDirAgnt 50) |
| 4 | HARDWARE FAULT (PCI-I/F) |
| 5 | HARDWARE FAULT (COMP) |
| 6 | HARDWARE FAULT (GVM10-6) |
| 7 | HARDWARE FAULT (PRB) |

| | FIXED PORTION | VARIABLE PORTION | LOG OF NEW APPARATUS | LOG OF EXISTING APPARATUS |
|---|---|---|---|---|
| 1 | HARDWARE FAULT | (I/OMod-EX) | PRESENCE | PRESENCE |
| 2 | HARDWARE FAULT | (MDirAgnt 100) | ABSENCE | PRESENCE |
| 3 | HARDWARE FAULT | (MDirAgnt 50) | ABSENCE | PRESENCE |
| 4 | HARDWARE FAULT | (PCI-I/F) | PRESENCE | PRESENCE |
| 5 | HARDWARE FAULT | (COMP) | ABSENCE | PRESENCE |
| 6 | HARDWARE FAULT | (GVM10-6) | ABSENCE | PRESENCE |
| 7 | HARDWARE FAULT | (PRB) | PRESENCE | PRESENCE |
| 8 | HARDWARE FAULT | (YMZ) | PRESENCE | PRESENCE |
| 9 | HARDWARE FAULT | (ISA) | PRESENCE | ABSENCE |
| 10 | HARDWARE FAULT | (SCSI) | PRESENCE | ABSENCE |
| 11 | HARDWARE FAULT | (MMF) | PRESENCE | ABSENCE |

MATCHING DEGREE = NUMBER OF MATCHES / TOTAL NUMBER OF PHRASES = 4/11 ≈ 0.36

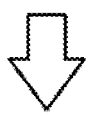

DESIGNATE VARIABLE PORTION OF PHRASE HAVING FIXED PORTION "HARDWARE FAULT" AS WILD CARD AND REGISTER IN DICTIONARY OF NEW APPARATUS (b)  <DICTIONARY OF NEW APPARATUS>

| 1 | HARDWARE FAULT * |
|---|---|

(c)  <DICTIONARY OF NEW APPARATUS>

| 1 | Service Level * has occurred with core |
|---|---| ary Laid-open Patent Publication No. 11-154160.
DICTIONARY CREATION APPARATUS, DICTIONARY CREATION METHOD, AND NON-TRANSITORY COMPUTER-READABLE STORAGE MEDIUM FOR STORING DICTIONARY CREATION PROGRAM

CROSS-REFERENCE TO RELATED APPLICATION

This application is based upon and claims the benefit of priority of the prior Japanese Patent Application No. 2019-159570, filed on Sep. 2, 2019, the entire contents of which are incorporated herein by reference.

FIELD

The embodiments discussed herein are related to a dictionary creation apparatus, a dictionary creation method, and a non-transitory computer-readable storage medium storing a dictionary creation program.

BACKGROUND

There is known a technique of analyzing a log output from an apparatus, in order to appropriately answer an inquiry from a customer who has introduced the apparatus when a support task of the apparatus is performed. In recent years, machine learning has been used in such a technique. In machine learning, for example, a characteristic phrase (character string) is extracted from a log, and an inference model for inferring an answer from an extraction result is created. It is known that a part of the characteristic phrase is registered in a dictionary, and whether the dictionary is appropriately created greatly affects an inference accuracy of the inference model.

Examples of the related art include Japanese Laid-open Patent Publication No. 2016-134124 and Japanese Laid-open Patent Publication No. 11-154160.

SUMMARY

According to an aspect of the embodiments, a dictionary creation apparatus includes: a memory; and a processor coupled to the memory, the processor being configured to execute a first specification processing that includes extracting a first plurality of character strings from a first dictionary to determine types of the first plurality of extracted character strings, the first plurality of character strings having a common part at a part thereof, the first dictionary including character strings extracted from a log of a first apparatus; execute a second specification processing that includes extracting a second plurality of character strings having the common part from the log of the first apparatus to determine types of the second plurality of character strings; execute a first determination processing that includes determining whether the types of the first plurality of character strings are limited with respect to the types of the second plurality of character strings; execute a second determination processing in response to a determination result indicating that the types of the first plurality of character strings are limited with respect to the types of the second plurality of character strings, the second determination processing including extracting a third plurality of character strings having the common part at a part thereof from a log of a second apparatus different from the first apparatus, determining types of the third plurality of character strings, and determining whether a matching degree between the types of the third plurality of character strings and the types of the second plurality of character strings is equal to or greater than a predetermined value; and execute a dictionary editing processing in response to a determination result indicating that the matching degree is equal to or greater than the predetermined value, the dictionary editing processing including registering the first plurality of character strings into a second dictionary configured to store character strings extracted from the log of the second apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9A illustrates an example of a dictionary of an existing apparatus;

FIG. 9B illustrates an example of a processing targets;

FIGS. 10A to 10D are diagrams for explaining processing of step S10 of FIG. 6;

FIG. 11 illustrates an example of a log of an existing apparatus and phrases extracted from the log of the existing apparatus;

FIG. 12 is a diagram for explaining a state in which variable portions specified in a dictionary of an existing apparatus are narrowed down with respect to variable portions specified in a log of the existing apparatus;

FIG. 13 is a diagram for explaining a state in which variable portions specified in a dictionary of an existing apparatus are not narrowed down with respect to variable portions specified in a log of the existing apparatus;

FIG. 14A illustrates another example of a state in which variable portions specified in a dictionary of an existing apparatus are not narrowed down with respect to variable portions specified in a log of the existing apparatus;

FIG. 14B illustrates another example of a state in which the variable portions are narrowed down;

FIG. 15 illustrates an example in which a matching degree is equal to or greater than a threshold; and FIG. 16 illustrates an example in which a matching degree is less than a threshold, and a diagram illustrating a phrase registered in a dictionary of a new apparatus, when a variable portion corresponding to a selected fixed portion is a wild card.

DESCRIPTION OF EMBODIMENT(S)

The phrase registered in the dictionary is an important phrase that characterizes the log of each apparatus, and is picked up by the person in charge in advance. However, since the phrase is different for each apparatus, it is required to customize the content registered in the dictionary for each apparatus.

Therefore, when an apparatus to be newly supported is added, it may take a lot of man-hours and time to create a dictionary of the apparatus. Further, there is a case where the phrase to be registered in the dictionary may not be known until the support task is performed to some extent.

In an aspect of embodiments, provided is a solution to easily create a dictionary in which a character string to be extracted from a log of an apparatus is registered.

Hereinafter, a dictionary creation apparatus according to an embodiment will be described in detail with reference to FIGS. 1 to 16.

Figure 1:
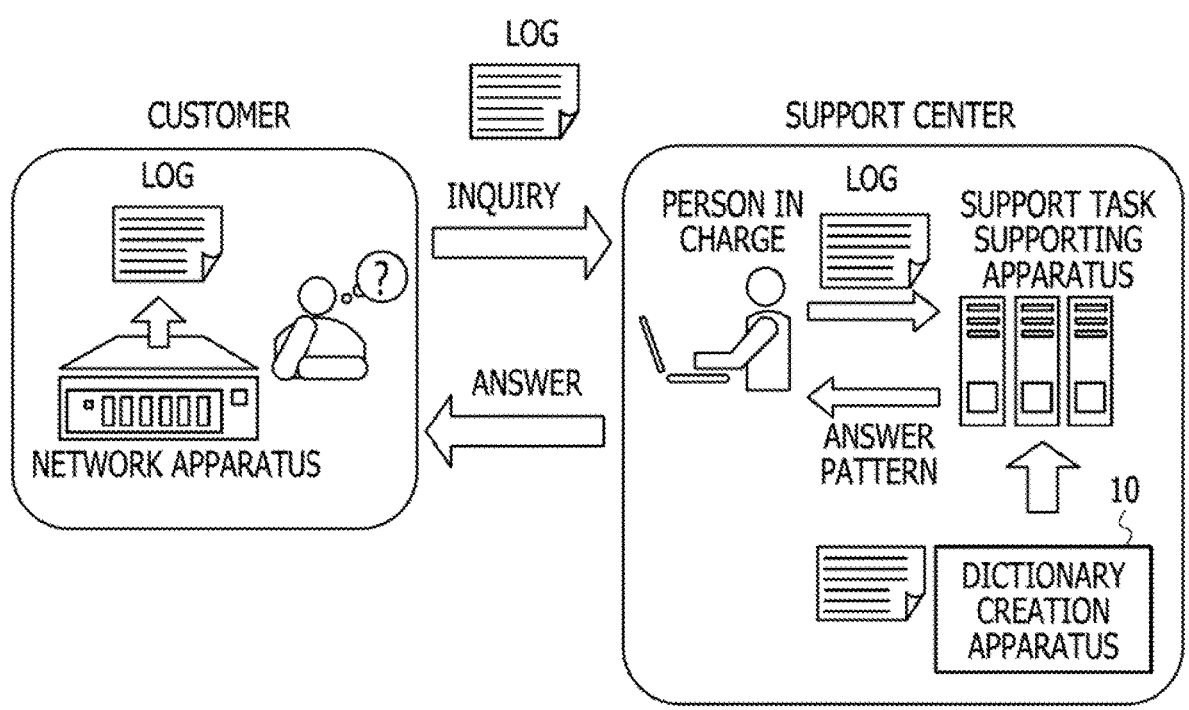
FIG. 1 schematically illustrates a usage scene of a dictionary creation apparatus according to an embodiment.

FIG. 1 schematically illustrates a usage scene of the dictionary creation apparatus 10 of the present embodiment. As illustrated in FIG. 1, in the present embodiment, when a person in charge of the support center receives an inquiry from a customer regarding an apparatus (for example, a network apparatus) introduced to the customer, the person in charge of the support center uses a support task supporting apparatus to answer appropriately. The dictionary creation apparatus 10 is coupled to the support task supporting apparatus.

When a failure or the like occurs in the network apparatus, the customer inquires about the failure by transmitting a log output from the network apparatus to the support center. The person in charge of the support center inputs the received log to the support task supporting apparatus, analyzes the log, and answers the customer with reference to an obtained answer pattern. Here, the dictionary creation apparatus 10 acquires the log output from the network apparatus in advance, and creates and provides a dictionary used for analysis by the support task supporting apparatus.

Figure 2:
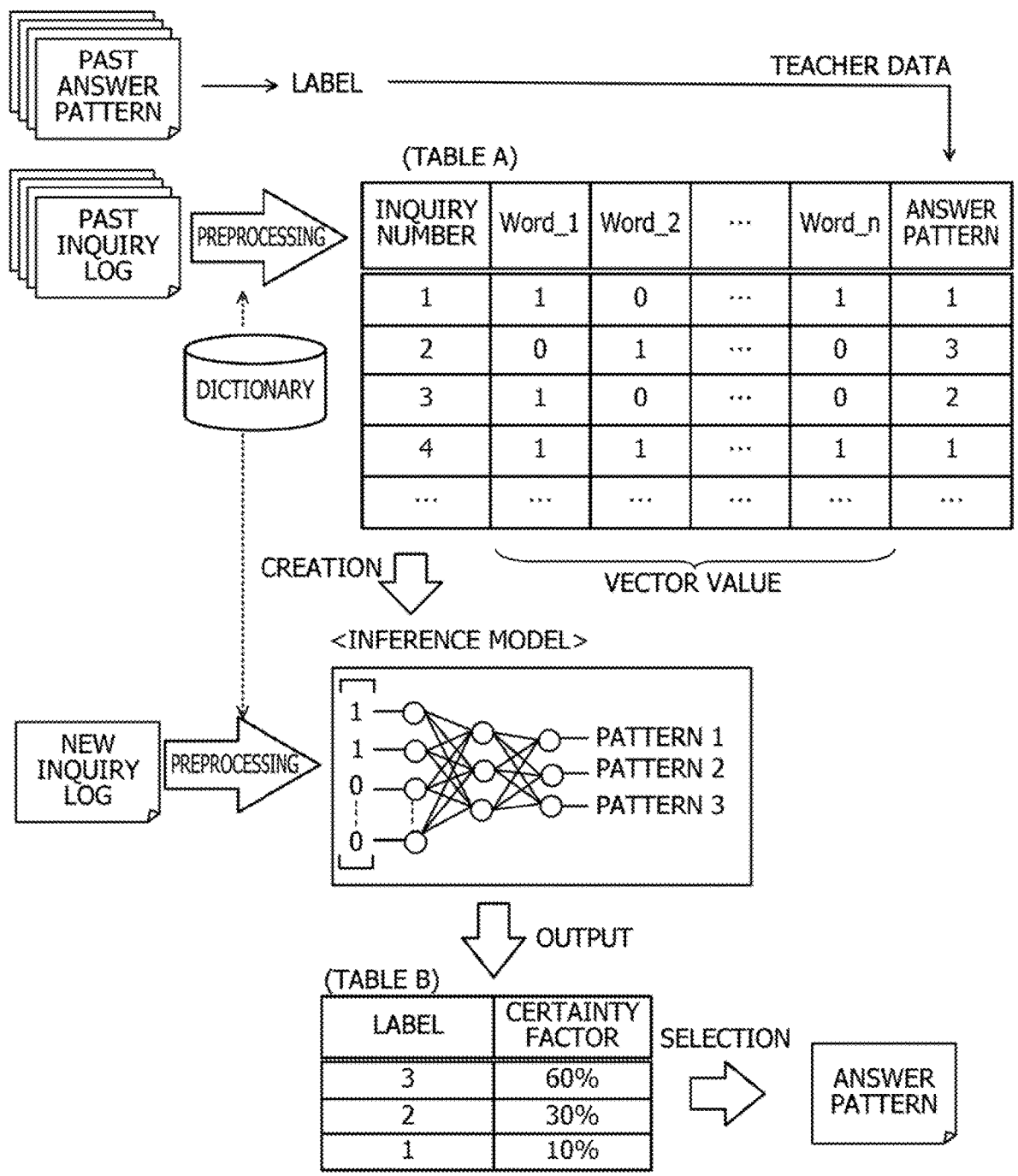
FIG. 2 illustrates an example of a log analysis method by a support task supporting apparatus.

FIG. 2 illustrates an example of a log analysis method performed by the support task supporting apparatus. In the present embodiment, the support task supporting apparatus analyzes a log by using machine learning and outputs an answer pattern. In machine learning, as preprocessing, a large number of phrases (character strings) are extracted from a past inquiry log, and a vector value is calculated for each phrase (Word_1, Word_2, . . . , Word_n) in each log. The vector value is, for example, a count value of the number of appearances of each phrase included in an inquiry log. At this time, the phrase extracted from the inquiry log is an important phrase characterizing the log of each network apparatus, and the phrases in which a part thereof is forcibly extracted are stored in the dictionary created by the dictionary creation apparatus 10. The phrase stored in the dictionary is, for example, a phrase or the like included only in a log corresponding to a certain answer pattern. Further, as illustrated in table A of FIG. 2, the vector value of each phrase of each inquiry log is associated with the number of the answer pattern (label), and an inference model is created based on this.

On the other hand, when the person in charge of the support center inputs a new inquiry log, as in the case of the past inquiry log, a large number of phrases are extracted from the new inquiry log to calculate vector values, and the calculated vector values are input to the inference model, as preprocessing. As a result, answer pattern candidates corresponding to the new inquiry log are output together with certainty factor values (refer to table B in FIG. 2).

The person in charge of the support center is able to select an appropriate answer pattern by referring to table B and answer the inquiry of the customer.

Meanwhile, when a new network apparatus (new apparatus) for which an inference model has not been created is to be supported, it is required to newly create a dictionary of the new apparatus. When the operation is performed by a person in charge, it may take a lot of man-hours and time. Therefore, in the present embodiment, the dictionary creation apparatus 10 creates a dictionary (second dictionary) to be used for supporting a new apparatus, by using a dictionary (first dictionary) used for supporting an existing apparatus (an apparatus that is already a support target).

It is noted that, as the existing apparatus when creating a dictionary of the new apparatus, an apparatus similar to the new apparatus, such as an apparatus belonging to the same vendor as the new apparatus may be adopted. As a result, there is a possibility that the dictionary of the new apparatus may be created more accurately. However, the present embodiment is not limited to this, and various existing apparatuses may be adopted as the existing apparatus regardless of the new apparatus.

Figure 3:
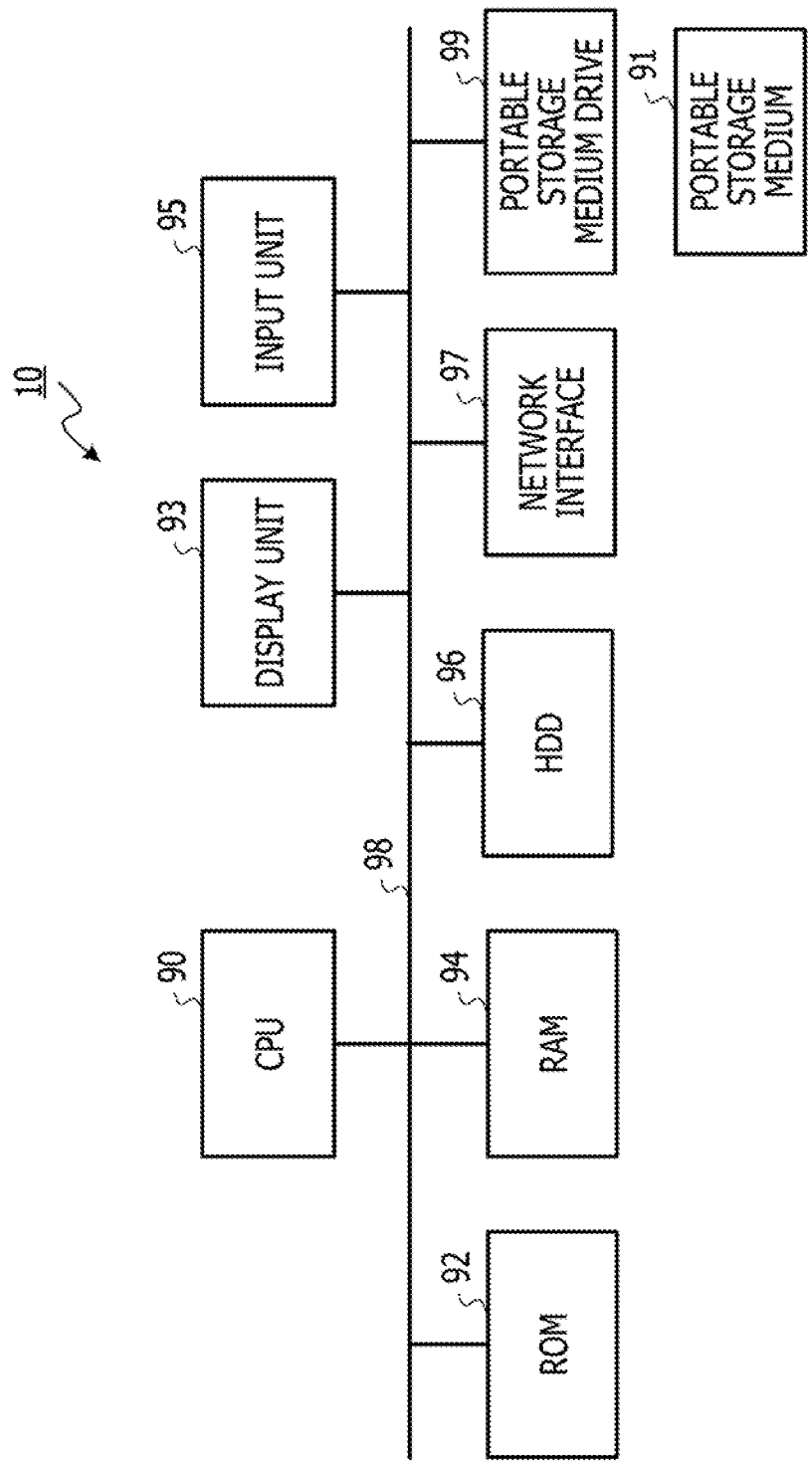
FIG. 3 illustrates a hardware configuration of a dictionary creation apparatus.

Hereinafter, the dictionary creation apparatus 10 will be described in detail. FIG. 3 illustrates a hardware configuration of the dictionary creation apparatus 10. The dictionary creation apparatus 10 includes a central processing unit (CPU) 90, a read-only memory (ROM) 92, a random-access memory (RAM) 94, a storage unit (here, a hard disk drive (HDD)) 96, a network interface 97, a display unit 93, an input unit 95, a portable storage medium drive 99, and the like. These components of the dictionary creation apparatus 10 are coupled to each other by the bus 98. In the dictionary creation apparatus 10, the CPU 90 executes a program (including a dictionary creation program) stored in the ROM 92 or the HDD 96, or a program read from a portable storage medium 91 by the portable storage medium drive 99 to realize the functions of the respective units illustrated in FIG. 4. Note that, the functions of the units illustrated in FIG. 4 may be realized by an integrated circuit, such as an application-specific integrated circuit (ASIC) or a field-programmable gate array (FPGA), for example.

Figure 4:
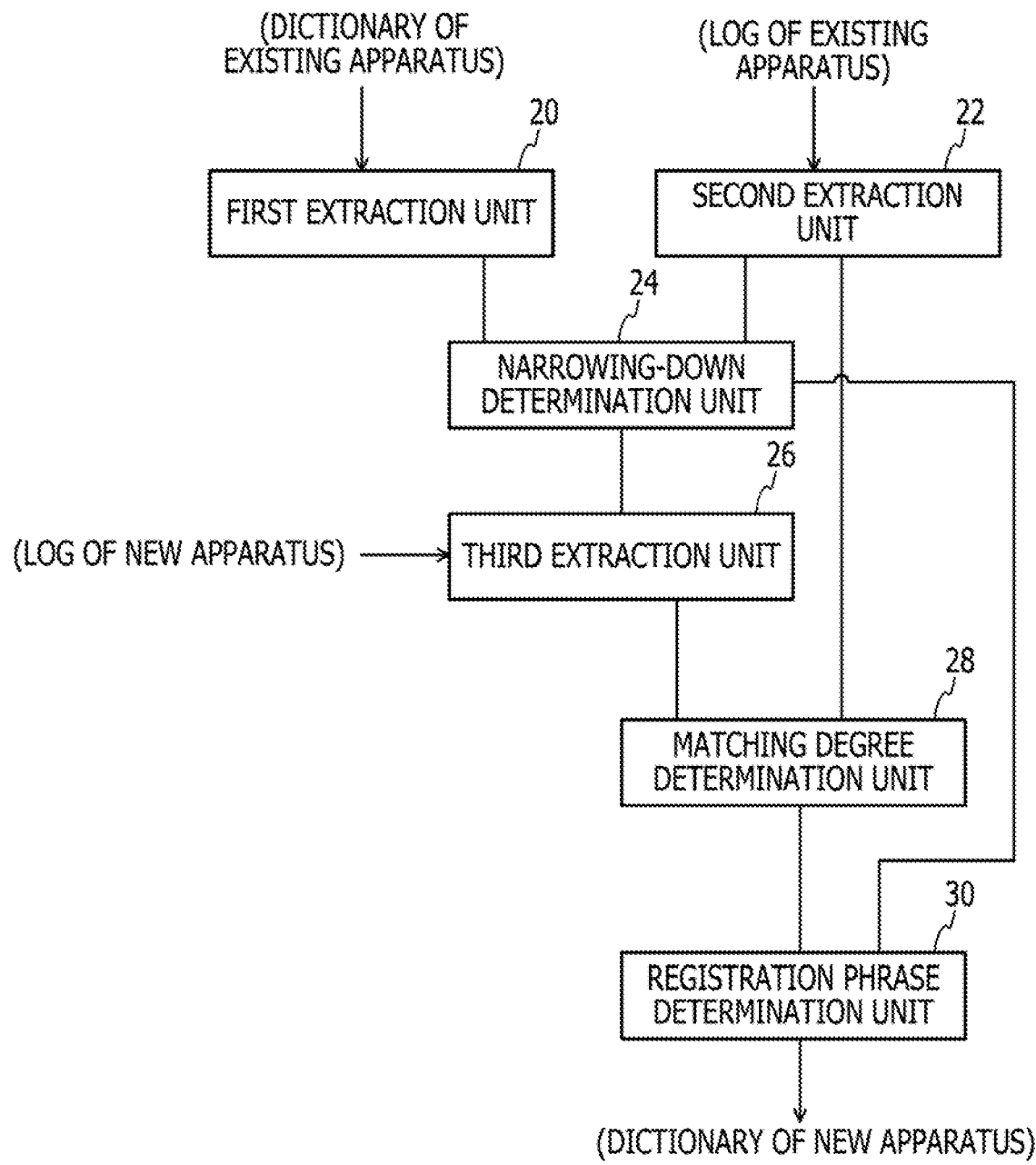
FIG. 4 is a functional block diagram of a dictionary creation apparatus.
Figure 5:
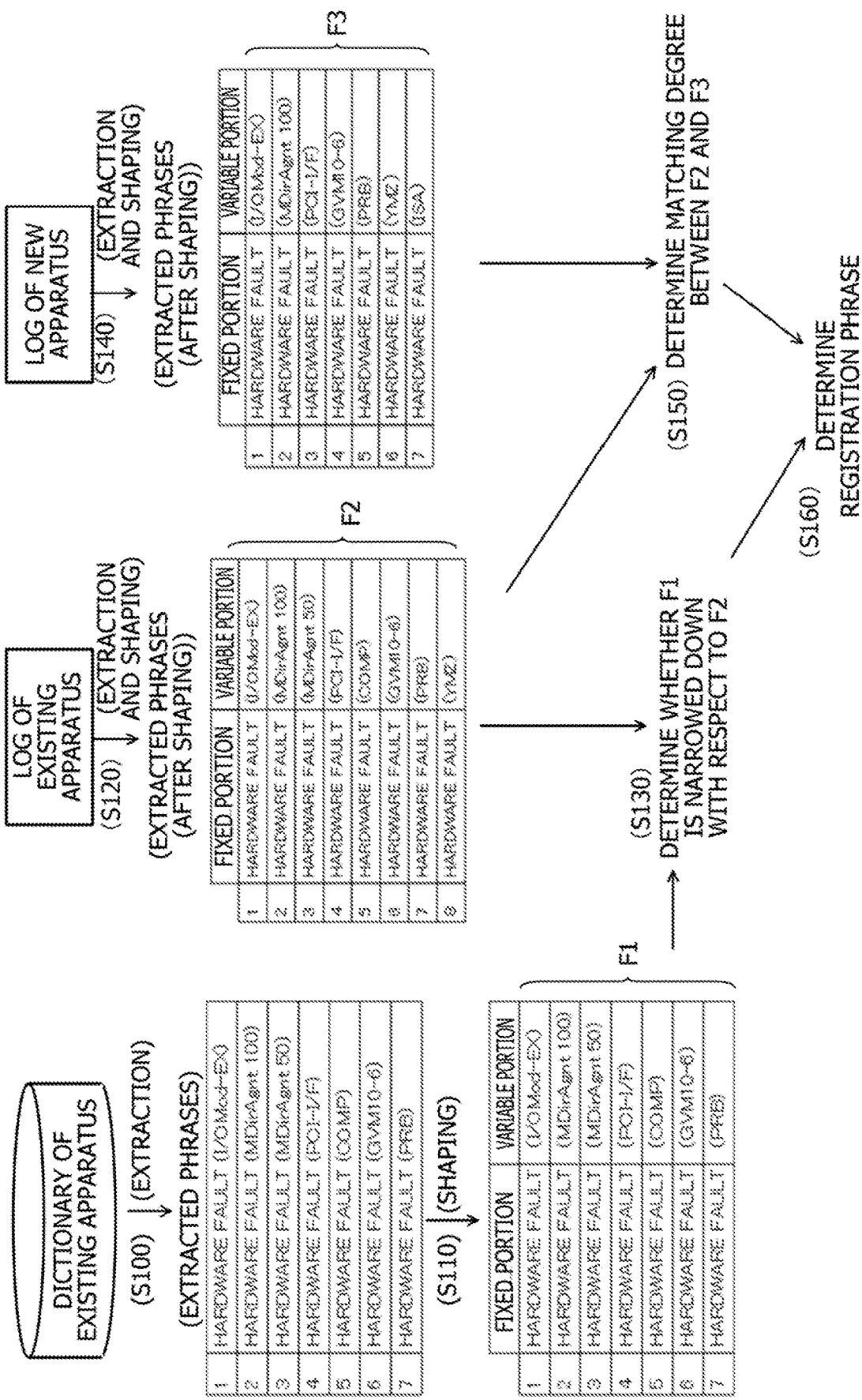
FIG. 5 illustrates an outline of processing of a dictionary creation apparatus.

FIG. 4 illustrates a functional block diagram of the dictionary creation apparatus 10. In the dictionary creation apparatus 10, when the CPU 90 executes a program, functions as a first extraction unit 20, a second extraction unit 22, a narrowing-down determination unit 24 as a first determination unit, a third extraction unit 26, a matching degree determination unit 28, and a registration phrase determination unit 30 as a dictionary editing unit are realized. Hereinafter, the functions of the respective units of the dictionary creation apparatus 10 will be described with reference to FIG. 5 illustrating an outline of the processing of the dictionary creation apparatus 10.

The first extraction unit 20 extracts phrases having a common part at a part thereof from the dictionary of the existing apparatus and groups the extracted phrases (step S100 in FIG. 5), and divides the extracted phrase into a common part (called a fixed portion) and a non-common part (called a variable portion) (step S110). Hereinafter, the processing of dividing into the fixed portion and the variable portion is referred to as "shaping". Note that, in FIG. 5, only the phrase groups having a fixed portion (HARDWARE FAULT) are illustrated, but the first extraction unit 20 extracts all of the phrase groups having a common part at a part thereof from the dictionary of the existing apparatus and shapes them.

The second extraction unit 22 extracts phrases including the fixed portion of the phrases extracted by the first extraction unit 20 from a log of the existing apparatus, groups the phrases, and shapes the phrases (step S120). Note that, in FIG. 5, only a group of phrases having the fixed portion (HARDWARE FAULT) is illustrated.

The narrowing-down determination unit 24 specifies types (variation) of the variable portions corresponding to a certain fixed portion (for example, "HARDWARE FAULT") extracted by the second extraction unit 22. Further, the narrowing-down determination unit 24 specifies types (variation) of the variable portions corresponding to a certain fixed portion (for example, "HARDWARE FAULT") extracted by the first extraction unit 20. Further, by referring to the respective types of the variable portions, it is determined whether the types of the variable portions specified in the dictionary of the existing apparatus are in a state of being narrowed down with respect to the types of the variable portions specified in the log of the existing apparatus (step S130). That is, in the example of FIG. 5, the narrowing-down determination unit 24 determines that the variable portions indicated by a symbol F2 are in the narrowed-down state when the variable portions include all the variable portions indicated by a symbol F1 and do not completely match. Here, the phrase being narrowed down in the dictionary of the existing apparatus means that there is a high possibility that only the characteristic phrases among the phrases existing in the log are registered in the dictionary.

When the narrowing-down determination unit 24 determines that it is the narrowed-down state, the third extraction unit 26 extracts the phrases including the fixed portion (for example, "HARDWARE FAULT") from the log of the new apparatus from the log of the existing apparatus and shapes the extracted phrases (step S140).

The matching degree determination unit 28 determines a matching degree (matching ratio) between the types (F2) of the variable portions of the phrases extracted by the second extraction unit 22 and the types (F3) of the variable portions of the phrases extracted by the third extraction unit 26 (step S150). Note that, details of the matching degree will be described later.

The registration phrase determination unit 30 determines a phrase to be registered in the dictionary of the new apparatus based on the determination result of the narrowing-down determination unit 24 and the determination result of the matching degree determination unit 28 (step S160). Details of the processing of the registration phrase determination unit 30 will be described later.

(Regarding Processing of Dictionary Creation Apparatus 10)

Figure 6:
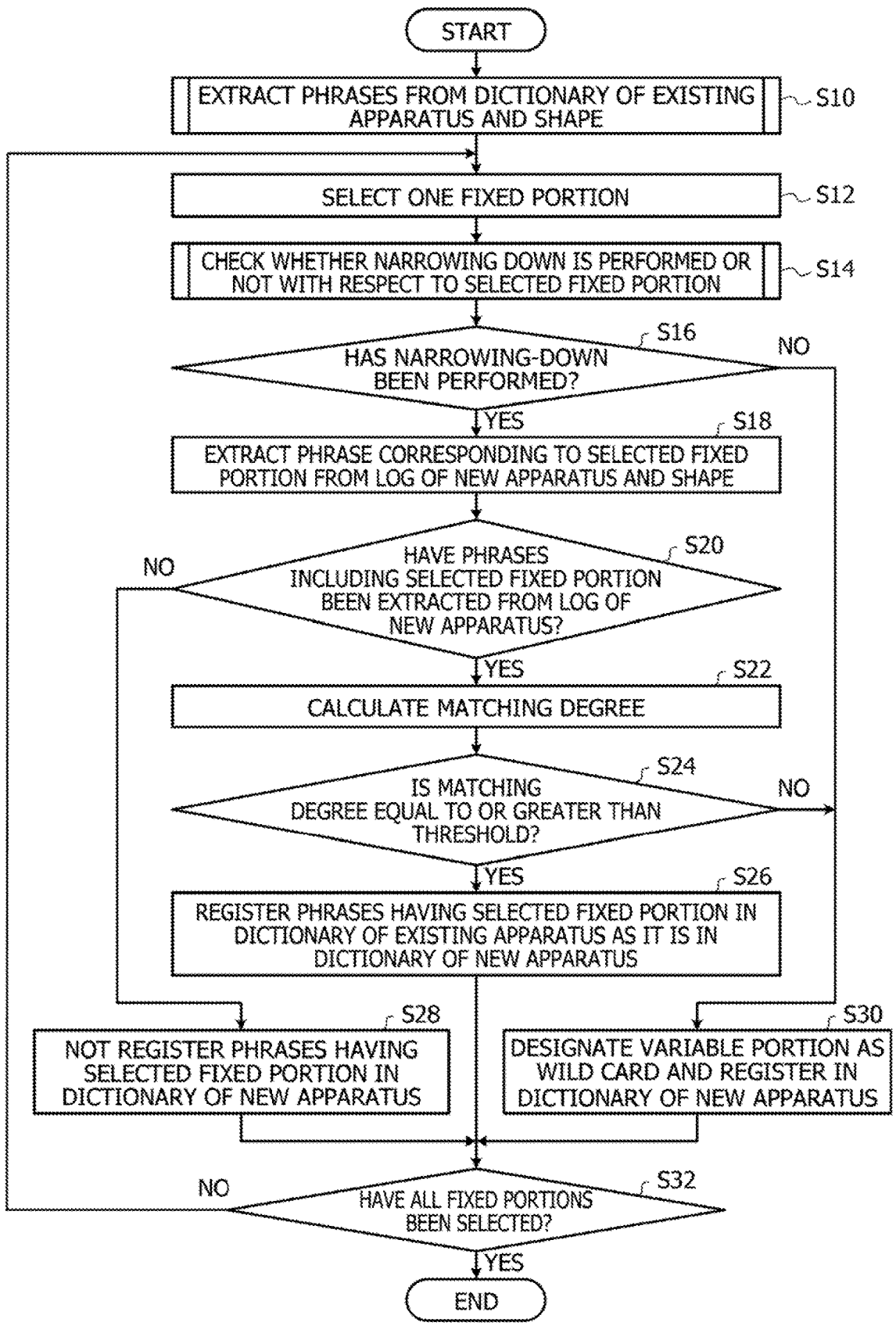
FIG. 6 is a flowchart illustrating overall processing of a dictionary creation apparatus.

Hereinafter, the processing of the dictionary creation apparatus 10 will be described in detail along with the flowcharts of FIGS. 6 to 8 while appropriately referring to the other drawings. FIG. 6 is a flowchart illustrating the overall processing of the dictionary creation apparatus 10, FIG. 7 is a flowchart illustrating the detailed processing of step S10 of FIG. 6, and FIG. 8 is a flowchart illustrating the detailed processing of step S14 of FIG. 6.

In the processing of FIG. 6, first, in step S10, the first extraction unit 20 extracts the phrases from the dictionary of the existing apparatus and executes shaping processing. For example, in step S10, the processing according to the flowchart of FIG. 7 is executed.

(Detailed Processing of Step S10)

Figure 7:
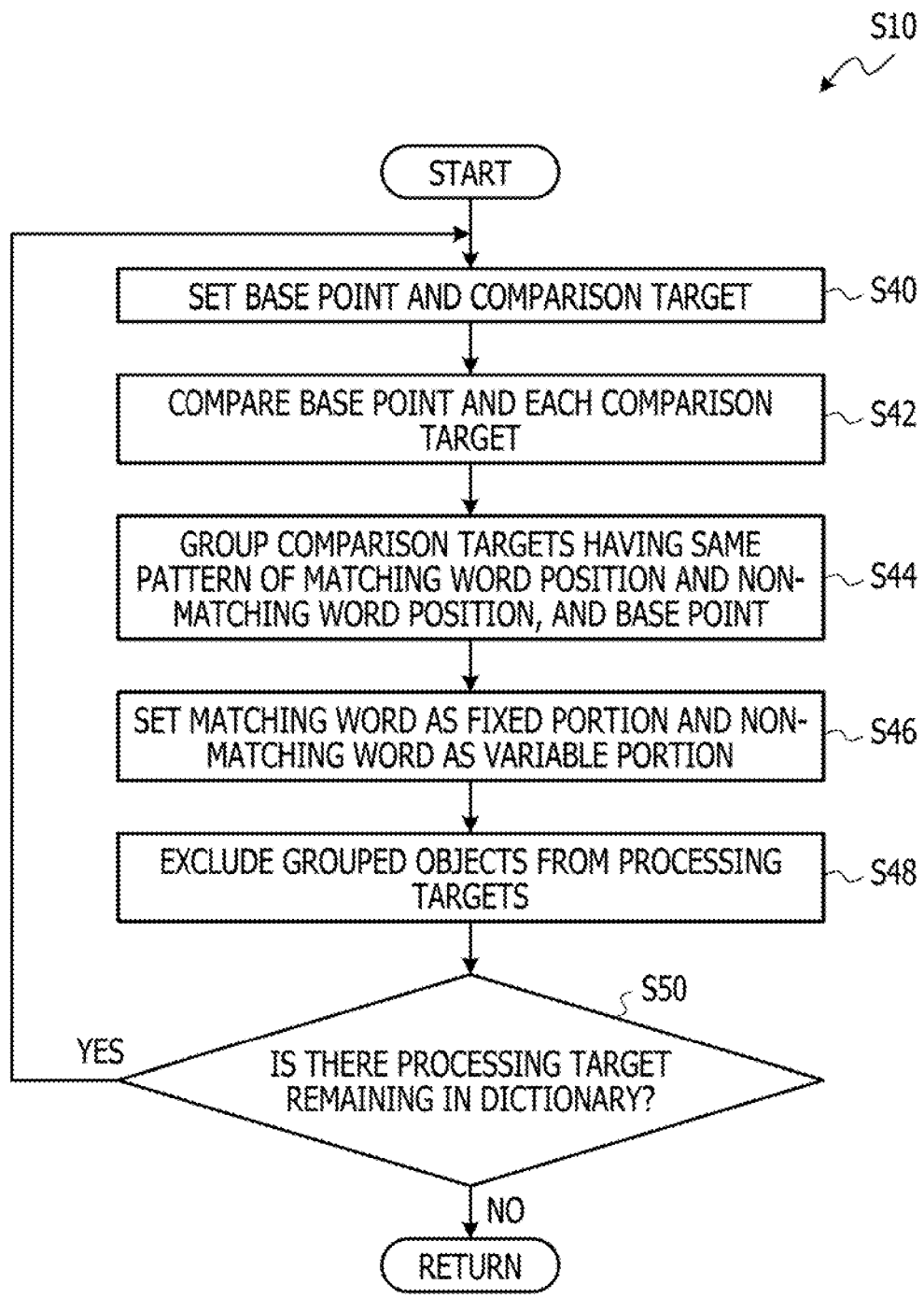
FIG. 7 is a flowchart illustrating details of processing of step S10 of FIG. 6.
Figure 8:
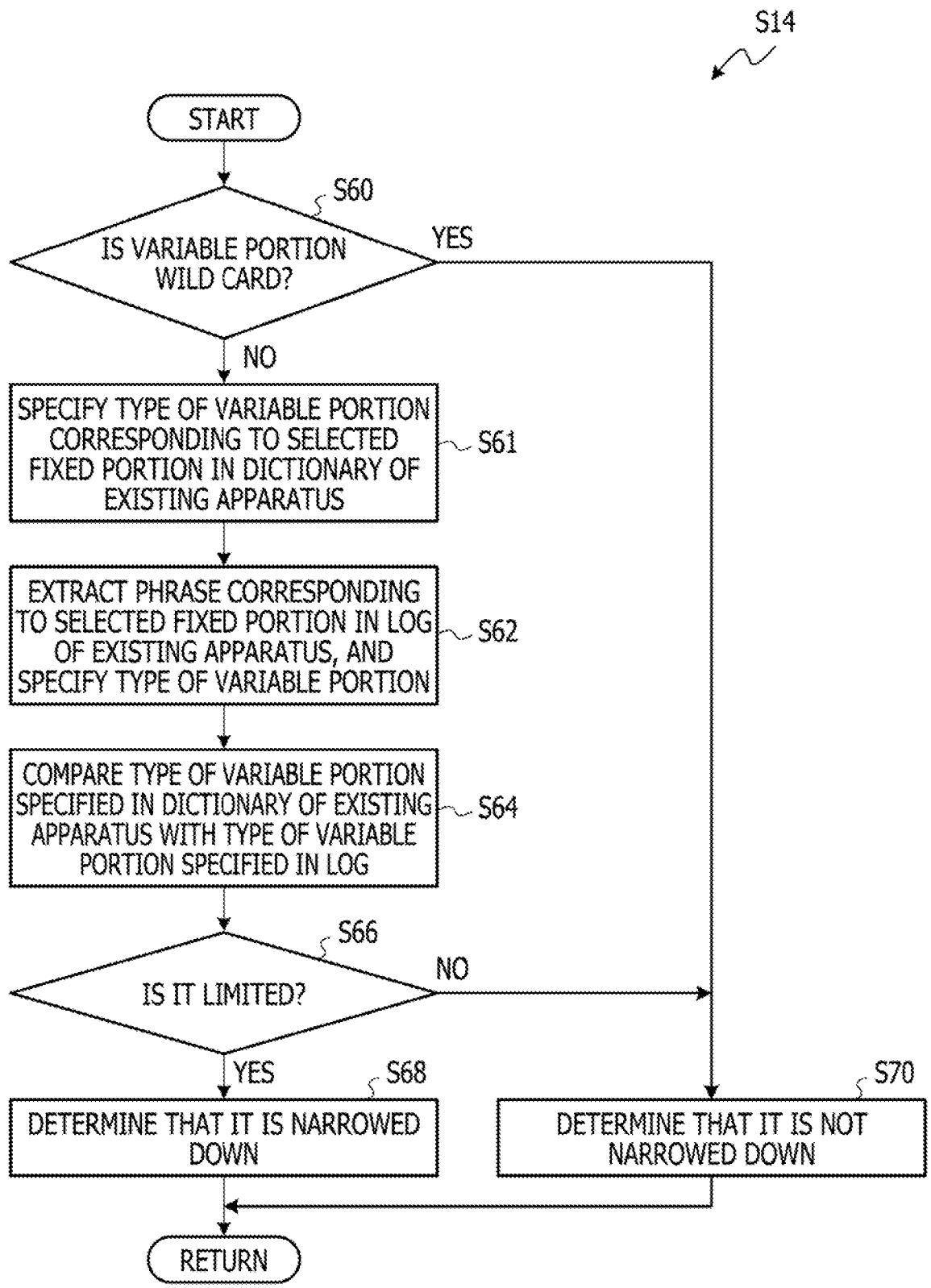
FIG. 8 is a flowchart illustrating details of processing of step S14 of FIG. 6.

In the processing of FIG. 7, first, in step S40, the first extraction unit 20 sets a base point and a comparison target. For example, it is assumed that the dictionary of the existing apparatus has 11 phrases as illustrated in FIG. 9A. In this case, as illustrated in FIG. 9B, the first extraction unit 20 sets the entire dictionary of the existing apparatus as a processing target, sets a first phrase as the base point, and sets the remaining second to eleventh phrases as the comparison targets.

Next, in step S42, the first extraction unit 20 compares the phrase of the base point with each phrase of the comparison target. In this case, the first extraction unit 20 distinguishes between, for each word, a word that matches a word included in the phrase of the base point and a word that does not match the word included in the phrase of the base point.

Further, in step S44, the first extraction unit 20 groups the comparison targets having the same pattern of a matching word position and a non-matching word position, and the base point. For example, in the example of FIG. 9B, the matching word (HARDWARE FAULT) of the base point and the comparison targets 1 to 6 are a first word and a second word and the non-matching word is a third word, and the patterns of the matching word position and the non-matching word position are the same. Therefore, the first extraction unit 20 groups these phrases as one group.

Next, in step S46, the first extraction unit 20 sets the matching word (HARDWARE FAULT) of each phrase included in the group as a fixed portion and the non-matching word (other than HARDWARE FAULT) as a variable portion, thereby shaping the phrase. FIG. 10A illustrates a state in which the base point and the comparison targets 1 to 6 are shaped (extracted phrase (after shaping)).

Next, in step S48, the first extraction unit 20 excludes the grouped objects from the processing targets. In this case, the processing targets are those illustrated in FIG. 10B which are obtained by excluding the extracted phrases of FIG. 10A from the dictionary of the existing apparatus of FIG. 9A.

Next, in step S50, the first extraction unit 20 determines whether a processing target remains. When the determination in step S50 is affirmative, the process returns to step S40. After that, the first extraction unit 20 sets the base point and the comparison targets 1, 2, and 3 for the processing targets of FIG. 10B (S40), groups the base point and the comparison targets 1 and 2 (S44), and shapes them (S46). As a result, the extracted phrases (after shaping) as illustrated in FIG. 10C are obtained.

Thereafter, the grouped phrases are excluded from the processing targets, but since "Service Level*has occurred with core" remains in the processing target, the determination in step S50 is affirmative, and the process returns to step S40. Thereafter, by further executing steps S40 to S50, the extracted phrase (after shaping) as illustrated in FIG. 10D is obtained. Note that, "Service Level*has occurred with core" includes "*" indicating a wild card (optional character string). In such a case, the wild card (*) is set as a non-matching word (variable portion), and the other words are set as matching words (fixed portion). Thereafter, when the determination in step S50 is negative, the process proceeds to step S12 in FIG. 6.

Returning to FIG. 6, in step S12, the narrowing-down determination unit 24 selects one fixed portion from the group (extracted phrases (after shaping)) obtained in step S10. Here, it is assumed that the narrowing-down determination unit 24 selects the fixed portion "HARDWARE FAULT" from FIGS. 10A, 10C, and 10D.

Next, in step S14, the narrowing-down determination unit 24 and the second extraction unit 22 execute processing of checking whether the narrowing-down is performed or not with respect to the selected fixed portion. For example, in step S14, the processing according to the flowchart of FIG. 8 is executed.

(Detailed Processing of Step S14)

In the processing of FIG. 8, first, in step S60, it is determined whether the variable portion corresponding to the selected fixed portion is a wild card. When the determination in step S60 is negative, the processing proceeds to step S61.

When the process proceeds to step S61, the narrowing-down determination unit 24 specifies the type (variation) of the variable portion corresponding to the selected fixed portion (HARDWARE FAULT) in the dictionary (FIG. 9A) of the existing apparatus. Here, the narrowing-down determination unit 24 specifies seven types ((I/OMod-EX), (MDirAgnt 100), . . . , (PRB)) illustrated in FIG. 10A. Note that, the seven types specified here may also be said to be the number of types of phrases (FIG. 10A) extracted from the dictionary of the existing apparatus.

Next, in step S62, the second extraction unit 22 extracts the phrases corresponding to the selected fixed portion (HARDWARE FAULT) from the log of the existing apparatus. Further, the narrowing-down determination unit 24 specifies the types (variation) of the variable portions. More specifically, the second extraction unit 22 prepares a log of the existing apparatus as illustrated in the section (a) of FIG. 11. Note that, the log of the existing apparatus is a log transmitted when an inquiry is made from a customer. The second extraction unit 22 extracts the phrases including the selected fixed portion (HARDWARE FAULT) from the log of the existing apparatus, and divides (shapes) the phrases into a fixed portion and a variable portion as illustrated in the section (b) of FIG. 11. In the example of FIG. 11, the narrowing-down determination unit 24 specifies eight types ((I/OMod-EX), (MDirAgnt 100), . . . , (PRB), and (YMZ)) as the types of the variable portions. Note that, the eight types specified here may also be said to be the number of types of phrases (FIG. 11) extracted from the log of the existing apparatus.

Next, in step S64, the narrowing-down determination unit 24 compares the types of the variable portions specified in the dictionary of the existing apparatus (FIG. 10A) with the types of the variable portions specified in the log of the existing apparatus (FIG. 11). In the comparison, it is checked whether the types of the variable portions specified in the dictionary of the existing apparatus are limited to the types of the variable portions specified in the log of the existing apparatus. Here, "limited" means that each of the variable portions specified in the dictionary of the existing apparatus is included in the variable portions specified in the log of the existing apparatus and it is not a complete match.

Next, in step S66, the narrowing-down determination unit 24 determines whether the types are limited. In the examples illustrated in FIGS. 10A and 11, as illustrated in FIG. 12, the variable portions (8 types) specified in the dictionary of the existing apparatus include all of the variable portions (7 types) specified in the log of the existing apparatus and the other variable portions, and thus it is determined that the types are limited. In this case, the determination in step S66 in FIG. 8 is affirmative, and the process proceeds to step S68.

When the process proceeds to step S68, the narrowing-down determination unit 24 determines that narrowing-down has been performed, ends the entire processing of FIG. 8, and proceeds to step S16 of FIG. 6.

On the other hand, when the determination in step S66 is negative, the process proceeds to step S70. For example, as illustrated in the lower part of FIG. 13, when there are seven types of variable portions specified in the log of the existing apparatus, as illustrated in the upper part of FIG. 13, there are seven types of variable portions specified in the dictionary of the existing apparatus, and thus it is assumed that it is a complete match. In this case, since the types are not limited, a negative determination is made in step S66, the process proceeds to step S70, and the narrowing-down determination unit 24 determines that narrowing-down has not been performed. Thereafter, the process proceeds to step S16 in FIG. 6.

Note that, for example, as illustrated in the upper left diagram of FIG. 14A, it is assumed that "Service Level, has occurred with core" is selected as a fixed portion and two types of phrases are extracted from the dictionary of the existing apparatus. Further, it is assumed that two types of phrases illustrated in the lower right diagram of FIG. 14A are extracted as the phrases including the selected fixed portion "Service Level, has occurred with core" from the log of the existing apparatus. In such a case, since the types of the variable portions completely match in the upper left diagram and the lower right diagram of FIG. 14A, it is determined that the dictionary of the existing apparatus is not narrowed down (S70). On the other hand, as illustrated in the upper left diagram of FIG. 14B, it is assumed that "Service Level, has occurred with core" is selected as the fixed portion and one type of phrase is extracted from the dictionary of the existing apparatus. Further, it is assumed that two types of phrases illustrated in the lower right diagram of FIG. 14B are extracted as the phrases including the selected fixed portion "Service Level, has occurred with core" from the log of the existing apparatus. In such a case, it is determined that the dictionary of the existing apparatus has been narrowed down (S68).

Meanwhile, in step S12 in FIG. 6, it is assumed that the fixed portion "Service Level, has occurred with core" in FIG. 10D is selected as the fixed portion. In this case, since the variable portion is a wild card, in the processing of FIG. 8, the determination in step S60 is affirmative, and the processing proceeds to step S70 without going through the processing and determination of steps S61 to S66. When the process proceeds to step S70, the narrowing-down determination unit 24 determines that the dictionary of the existing apparatus has not been narrowed down.

Returning to FIG. 6, when the process proceeds to step S16, the narrowing-down determination unit 24 determines whether the narrowing-down has been performed. When the determination in step S16 is affirmative, the process proceeds to step S18.

When the process proceeds to step S18, the third extraction unit 26 extracts a phrase corresponding to the selected fixed portion (HARDWARE FAULT) from the log of the new apparatus, and performs shaping by dividing into the fixed portion and the variable portion. In this case, the third extraction unit 26 searches for the phrases including "HARDWARE FAULT" in the log of the new apparatus. For example, it is assumed that the phrases extracted from the log of the new apparatus are the phrases as illustrated in the section (a) of FIG. 15.

Next, in step S20, the matching degree determination unit 28 determines whether the phrases including the selected fixed portion are extracted from the log of the new apparatus. When at least one phrase is extracted as illustrated in the section (a) of FIG. 15, the determination in step S20 is affirmative, and the process proceeds to step S22.

When the process proceeds to step S22, the matching degree determination unit 28 calculates the matching degree between the phrases (refer to the section (a) of FIG. 15) extracted from the log of the new apparatus and the phrases (refer to the section (b) of FIG. 15) extracted from the log of the existing apparatus. Specifically, the matching degree determination unit 28 creates a table as illustrated in the section (c) of FIG. 15 by using the phrases (the section (b) of FIG. 15) extracted from the log of the existing apparatus and the phrases (the section (a) of FIG. 15) extracted from the log of the new apparatus. Here, in the table illustrated in the section (c) of FIG. 15, all phrases (fixed portion and variable portion) illustrated in the section (a) and (b) of FIG. 15 are listed, and whether each phrase is extracted from the log of the existing apparatus or the log of the new apparatus is indicated by "presence" and "absence". From the table illustrated in the section (c) of FIG. 15, the matching degree determination unit 28 obtains the ratio of the phrases extracted from both the log of the existing apparatus and the log of the new apparatus in all the phrases as the "matching degree". In the example illustrated in the section (c) of FIG. 15, the ratio of the number of phrases in which "present" is stored in a field of the existing apparatus log and "present" is stored in a field of the new apparatus log with respect to the total number of phrases extracted (the number of matches/the total number of phrases=6/9≈0.67) is obtained and set as the matching degree.

Next, in step S24, the matching degree determination unit 28 determines whether the matching degree is equal to or greater than a threshold. For example, when the threshold is 0.6, in the example illustrated in the section (c) of FIG. 15, the determination in step S24 is affirmative, and the process proceeds to step S26. Note that, in step S24, it is able to be said that it is determined whether the narrowing-down in the existing apparatus is effective even in the new apparatus.

When the process proceeds to step S26, the variation of the variable portions specified in the log of the existing apparatus may be regarded as substantially the same as the variation of the variable portions specified in the log of the new apparatus. In this case, it is considered effective to use the same narrowing-down rule as that of the existing apparatus also in the new apparatus. Therefore, in step S26, the registration phrase determination unit 30 registers the phrases having the selected fixed portion (HARDWARE FAULT) in the dictionary of the existing apparatus by directly diverting the phrases to the dictionary of the new apparatus (refer to the section (d) of FIG. 15). Thereafter, the process proceeds to step S32.

On the other hand, FIG. 16 illustrates an example in which the matching degree is less than the threshold. In the example illustrated in the section (a) of FIG. 16, the presence or absence of the phrase included in the log of the new apparatus and the presence or absence of the phrase included in the log of the existing apparatus do not match well. In the section (a) of FIG. 16, when the matching degree is calculated in the same manner as in the section (c) of FIG. 15, the matching degree=4/11≈0.36, and the threshold is less than 0.6. In such a case, the determination in step S24 is negative, and the process proceeds to step S30. When the process proceeds to step S30, since it is regarded that the variation of the variable portions specified in the log of the existing apparatus is significantly different from the variation of the variable portions specified in the log of the new apparatus, the same narrowing-down rule as that of the existing apparatus is not able to be used. Therefore, in step S30, the registration phrase determination unit 30 designates the variable portion as a wild card (*) (optional character string) as illustrated in the section (b) of FIG. 16 and registers it in the dictionary of the new apparatus. That is, information indicating that all phrases having a fixed portion (HARDWARE FAULT) are extracted is registered in the dictionary of the new apparatus. Thereafter, the process proceeds to step S32.

Meanwhile, when the determination in step S16 is negative, for example, when the phrases extracted from the dictionary of the existing apparatus have not been narrowed down with respect to the phrases extracted from the log of the existing apparatus, the registration phrase determination unit 30 also proceeds to the process of step S30. Also, in this case, as illustrated in the section (b) of FIG. 16, the registration phrase determination unit 30 designates the variable portion as a wild card and registers it in the dictionary of the new apparatus. Note that, the case where the determination in step S16 is negative includes a case where the variable portion of the phrase extracted from the dictionary of the existing apparatus is a wild card as illustrated in FIG. 10D. In this case, in step S30, as illustrated in the section (c) of FIG. 16, the registration phrase determination unit 30 registers the phrase itself extracted from the dictionary of the existing apparatus in the dictionary of the new apparatus.

Further, when the determination in step S20 is negative in the processing of FIG. 6, for example, when the phrase including the selected fixed portion (HARDWARE FAULT) has not been extracted from the log of the new apparatus, the registration phrase determination unit 30 proceeds to the process of step S28. When the process proceeds to step S28, the registration phrase determination unit 30 does not register the phrase having the selected fixed portion (HARDWARE FAULT) in the dictionary of the new apparatus. Thereafter, the process proceeds to step S32.

When the process proceeds to step S32, the narrowing-down determination unit 24 determines whether all the fixed portions have been selected. When the determination of step S32 is negative, the process returns to step S12, and the processing of steps S12 to S32 described above is repeatedly executed until the determination of step S32 is affirmative. When the determination in step S32 is affirmative, the entire processing of FIG. 6 ends.

As is seen from the above description, in the present embodiment, the first extraction unit 20 and the narrowing-down determination unit 24 realize a function as a first specification unit that extracts a phrase from a dictionary of the existing apparatus and specifies the type of the extracted phrase (the type of the variable portion). Further, the second extraction unit 22 and the narrowing-down determination unit 24 realize a function as a second specification unit that extracts a phrase from a log of the existing apparatus and specifies the type of the extracted phrase (the type of the variable portion). Further, the third extraction unit 26 and the matching degree determination unit 28 realize a function as a second determination unit that extracts a phrase from a log of the new apparatus, specifies the type of the extracted phrase (the type of the variable portion), and determines whether the matching degree between the specified type and the type of the phrase (the type of the variable portion) extracted from the log of the existing apparatus is equal to or greater than a predetermined value.

As described above in detail, according to the present embodiment, the first extraction unit 20 extracts a plurality of phrases having a common part at a part thereof from the dictionary (the dictionary of the existing apparatus) in which the phrases extracted from the log of the existing apparatus are registered (S10), and the narrowing-down determination unit 24 specifies the types of the variable portions other than the common part (fixed portion) (S61). Further, the second extraction unit 22 extracts the phrases including the fixed portion from the log of the existing apparatus, and the narrowing-down determination unit 24 specifies the types of the variable portions included in the extracted phrases (S62). Further, the narrowing-down determination unit 24 determines whether the types of the variable portions specified from the dictionary of the existing apparatus are limited with respect to the types of the variable portion specified from the log of the existing apparatus (S66 to S70, and S16). As a result of the determination, when the types are limited (S16: affirmative), the third extraction unit 26 extracts the phrases including the fixed portion from the log of the new apparatus (S18). Further, the matching degree determination unit 28 determines whether the matching degree between the types of the variable portions included in the phrases extracted from the log of the new apparatus and the types of the variable portions specified from the log of the existing apparatus is equal to or greater than a threshold (S24). Moreover, when it is equal to or greater than the threshold (S24: affirmative), the registration phrase determination unit 30 registers the plurality of phrases extracted from the dictionary of the existing apparatus as they are in the dictionary of the new apparatus (S26). As a result, in the present embodiment, when the characteristic phrases are narrowed down and registered in the dictionary of the existing apparatus and the narrowing-down of the characteristic phrases is effective also in the log of the new apparatus, it is possible to automatically register the characteristic phrases of the dictionary of the existing apparatus in the dictionary of the new apparatus. Therefore, it is possible to register an appropriate phrase in the dictionary of the new apparatus without increasing the man-hours.

Further, in the present embodiment, in addition to a case where the new apparatus is an apparatus of the series of the existing apparatus, in a case where the composition (line card, interface card, chip, component) of the new apparatus is common or similar to that of the existing apparatus, it is possible to automatically create a dictionary of the new apparatus without increasing the man-hours.

Here, when a dictionary of a new apparatus is created, it is also conceivable to divert all dictionaries of the existing apparatus. However, in this case, even when the matching degree is less than the threshold (in a case of the section (a) of FIG. 16), only the narrowed down phrases are registered in the dictionary of the new apparatus. Therefore, since machine learning using an appropriate phrase is not performed, the inference accuracy of the answer pattern may decrease. On the other hand, in the present embodiment, when the matching degree is not equal to or greater than the threshold, all the phrases (phrases of which variable portions are designated as a wild card) including the fixed portion are registered in the dictionary of the new apparatus. Accordingly, an appropriate phrase (a characteristic phrase that is not present in the log of the existing apparatus but is present in the log of the new apparatus) is extracted from the log of the new apparatus. Therefore, the inference accuracy of the answer pattern may be improved as compared with the case where the dictionary of the existing apparatus is registered as it is in the dictionary of the new apparatus.

On the other hand, when the matching degree is low, a method of not registering the phrase including the selected fixed portion in the dictionary of the new apparatus is also conceivable. However, since the phrase including the selected fixed portion is included in the log of the new apparatus, there is a high possibility that at least the selected fixed portion is an important phrase characterizing the log of the new apparatus. Therefore, in the present embodiment, such phrases are registered in the dictionary of the new apparatus by wild card designation and forcibly extracted. With this configuration, it possible to improve the inference accuracy at the start of support of the new apparatus.

Further, in the present embodiment, the narrowing-down determination unit 24 determines that the types are limited, when all of the types of the variable portions specified in the dictionary of the existing apparatus are included in the types of the variable portions specified in the log of the existing apparatus and it is not a complete match (S14 and FIG. 8). Accordingly, it is possible to appropriately determine whether a characteristic phrase is registered in the dictionary of the existing apparatus.

Further, in the present embodiment, as a result of the determination by the narrowing-down determination unit 24, when the types are not limited (S16: negative), the registration phrase determination unit 30 registers all the phrases (phrases of which variable portions are designated as a wild card) including the selected fixed portion in the dictionary of the new apparatus (S30). Accordingly, it is possible to suppress the omission of extraction of the characteristic phrase from the log of the new apparatus.

Further, in the present embodiment, when the phrase including the selected fixed portion is not able to be extracted from the log of the new apparatus (S20: negative), the registration phrase determination unit 30 does not register the phrase including the selected fixed portion in the dictionary of the new apparatus (S28). As a result, it is possible to suppress the phrases that are highly likely to be undesirable when obtaining an answer pattern from the log of the new apparatus from being registered in the dictionary of the new apparatus.

Further, in the present embodiment, when a phrase including wild card designation is registered in the dictionary of the existing apparatus, the registration phrase determination unit 30 causes the phrase to be included in the dictionary of the new apparatus (S60: affirmative, S70, S16: negative, S30). Accordingly, it is possible to suppress the omission of extraction of the characteristic phrase from the log of the new apparatus.

Further, in the present embodiment, among the phrases, the types of the variable portions other than the fixed portion are specified, and whether it is narrowed down is determined and the matching degree is calculated. Therefore, it is possible to reduce the amount of processing compared with the case of determining whether it is narrowed down and calculating the matching degree using all phrases.

Note that, in the above embodiment, a case has been described in which a phrase extracted from the dictionary or the log is divided into a fixed portion and a variable portion and shaped, and the type of the variable portion is used to determine whether it is narrowed down and calculate the matching degree. However, the embodiment is not limited thereto. That is, the determination of whether it is narrowed down and the calculation of the matching degree may be performed by using the type of the phrase itself extracted from the dictionary or the log.

Note that, the aforementioned processing functions may be realized by a computer. In that case, there is provided a program that describes processing contents of a function which a processing apparatus is to have. The aforementioned processing functions are realized in the computer when the computer executes the program. The program that describes the processing contents may be recorded in a computer-readable storage medium (except for a carrier wave).

To distribute a program, a portable storage medium such as a digital versatile disc (DVD), a compact disc read-only memory (CD-ROM), or the like recording the program is marketed, for example. Further, the program may be stored in a storage device of a server computer and transferred from the server computer to another computer through a network.

For example, the computer executing the program stores the program recorded in the portable storage medium or the program transferred from the server computer in its own storage device. Moreover, the computer reads the program from its own storage device and executes processes in accordance with the program. Note that, the computer may read the program directly from the portable storage medium and execute the processes in accordance with the program. Further, every time the program is transferred from the server computer, the computer may sequentially execute the processes in accordance with the received program.

The aforementioned embodiments are examples of a preferred embodiment of the present invention. However, the embodiments are not limited thereto, and various modifications may be made without departing from the spirit of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A dictionary creation apparatus comprising:
   a memory; and
   a processor coupled to the memory, the processor being configured to
   execute a first specification processing that includes extracting a first plurality of character strings from a first dictionary to determine types of the first plurality of extracted character strings, the first plurality of character strings having a common part at a part thereof, the first dictionary including character strings extracted from a log of a first apparatus;
   execute a second specification processing that includes extracting a second plurality of character strings having the common part from the log of the first apparatus to determine types of the second plurality of character strings;
   execute a first determination processing that includes determining whether the types of the first plurality of character strings are limited with respect to the types of the second plurality of character strings;
   execute a second determination processing in response to a determination result indicating that the types of the first plurality of character strings are limited with respect to the types of the second plurality of character strings, the second determination processing including
   extracting a third plurality of character strings having the common part at a part thereof from a log of a second apparatus different from the first apparatus,
   determining types of the third plurality of character strings, and
   determining whether a matching degree between the types of the third plurality of character strings and the types of the second plurality of character strings is equal to or greater than a predetermined value; and
   execute a dictionary editing processing in response to a determination result indicating that the matching degree is equal to or greater than the predetermined value, the dictionary editing processing including registering the first plurality of character strings into a second dictionary configured to store character strings extracted from the log of the second apparatus.

2. The dictionary creation apparatus according to claim 1, wherein the first determination processing is configured to determine that the types are limited, when the types of the second plurality of character strings include all the types of the first plurality of character strings, and the types of the second plurality of character strings and the types of the first plurality of character strings are not completely matched.

3. The dictionary creation apparatus according to claim 1, wherein the dictionary editing processing is configured to cause information for extracting all character strings having the common part from the log of the second apparatus to be included in the second dictionary, when the types are not limited as the result of the determination by the first determination processing.

4. The dictionary creation apparatus according to claim 1, wherein the dictionary editing processing is configured to cause information for extracting all character strings including the common part from the log of the second apparatus to be included in the second dictionary, when the matching degree is not equal to or greater than the predetermined value.

5. The dictionary creation apparatus according to claim 1, wherein the dictionary editing processing does not cause the character strings having the common part to be included in the second dictionary, when the second determination processing is not able to extract the character strings including the common part from the log of the second apparatus.

6. The dictionary creation apparatus according to claim 1, wherein, when a character string having a portion in which an optional character is designated is registered in the first dictionary, the dictionary editing processing causes the character string to be included in the second dictionary.

7. The dictionary creation apparatus according to claim 1, wherein the determining of the types of the first plurality of character strings is configured to specify the types of parts of the first plurality of character strings other than the common part.

8. A dictionary creation method implemented by a computer, the method comprising:
   extracting a first plurality of character strings from a first dictionary to determine types of the first plurality of extracted character strings, the first plurality of character strings having a common part at a part thereof, a first dictionary including character strings extracted from a log of a first apparatus;
   extracting a second plurality of character strings having the common part from the log of the first apparatus to determine types of the second plurality of character strings;
   executing a first determination processing that includes determining whether the types of the first plurality of character strings are limited with respect to the types of the second plurality of character strings;
   executing a second determination processing in response to a determination result indicating that the types of the first plurality of character strings are limited with respect to the types of the second plurality of character strings, the second determination processing including extracting a third plurality of character strings having the common part at a part thereof from a log of a second apparatus different from the first apparatus, determining types of the third plurality of character strings, and determining whether a matching degree between the types of the third plurality of character strings and the types of the second plurality of character strings is equal to or greater than a predetermined value; and executing a dictionary editing processing in response to a determination result indicating that the matching degree is equal to or greater than the predetermined value, the dictionary editing processing including registering the first plurality of character strings into a second dictionary configured to store character strings extracted from the log of the second apparatus are registered.

9. A non-transitory computer-readable storage medium for storing a dictionary creation program which causes a processor to perform processing, the processing comprising:

extracting a first plurality of character strings from a first dictionary to determine types of the first plurality of extracted character strings, the first plurality of character strings having a common part at a part thereof, a first dictionary including character strings extracted from a log of a first apparatus;

extracting a second plurality of character strings having the common part from the log of the first apparatus to determine types of the second plurality of character strings;

executing a first determination processing that includes determining whether the types of the first plurality of character strings are limited with respect to the types of the second plurality of character strings;

executing a second determination processing in response to a determination result indicating that the types of the first plurality of character strings are limited with respect to the types of the second plurality of character strings, the second determination processing including extracting a third plurality of character strings having the common part at a part thereof from a log of a second apparatus different from the first apparatus, determining types of the third plurality of character strings, and determining whether a matching degree between the types of the third plurality of character strings and the types of the second plurality of character strings is equal to or greater than a predetermined value; and executing a dictionary editing processing in response to a determination result indicating that the matching degree is equal to or greater than the predetermined value, the dictionary editing processing including registering the first plurality of character strings into a second dictionary configured to store character strings extracted from the log of the second apparatus are registered.

* * * * *